United States Patent [19]

D'Angelo et al.

[11] 4,450,728
[45] May 29, 1984

[54] VEHICLE FORCE MEASUREMENT SYSTEM

[75] Inventors: Severino D'Angelo, Laguna Beach; Max J. Moore, Walnut, both of Calif.

[73] Assignee: Horiba Instruments Incorporated, Irvine, Calif.

[21] Appl. No.: 309,108

[22] Filed: Oct. 6, 1981

[51] Int. Cl.³ .............................................. G01L 5/13
[52] U.S. Cl. .................... 73/862.28; 73/117; 73/862.19
[58] Field of Search .................. 73/117, 117.3, 862.09, 73/862.12–862.19, 862.28

[56] References Cited

U.S. PATENT DOCUMENTS

| 3,197,986 | 8/1965 | Freedman et al. |
|---|---|---|
| 3,609,313 | 1/1969 | Lucien . |
| 3,651,690 | 3/1972 | Pagdin et al. |
| 3,718,036 | 2/1973 | Marten et al. ................ 73/862.18 X |
| 3,762,775 | 10/1973 | Ochiai . |
| 3,921,446 | 11/1975 | Ludloff . |
| 3,926,043 | 12/1975 | Marshall et al. |
| 3,930,409 | 1/1976 | Ostrander et al. |
| 4,000,928 | 1/1977 | Takeuchi et al. |
| 4,033,183 | 7/1977 | List et al. |
| 4,093,939 | 6/1978 | Mitchell . |
| 4,107,776 | 8/1978 | Beale . |
| 4,138,723 | 2/1979 | Nehmer et al. |
| 4,161,116 | 7/1979 | Fegraus et al. ............. 73/862.16 X |
| 4,179,740 | 12/1979 | Malin . |
| 4,212,063 | 8/1980 | Hardmark . |
| 4,327,578 | 5/1982 | D'Angelo ........................... 73/117 |

FOREIGN PATENT DOCUMENTS 751913  7/1975  France .

*Primary Examiner*—Charles A. Ruehl
*Attorney, Agent, or Firm*—Harness, Dickey & Pierce

[57] ABSTRACT

A vehicle force measurement system for determining the force output of a vehicle independent of the radius dimensions of the driving wheels of the vehicle. A fifth wheel is utilized to provide an accurate vehicle speed reading. Torque and RPM sensors mounted to the driving wheels of the vehicle are used to determine the total power output of the vehicle and the total force output of the vehicle is determined by dividing the total power output by the speed signal from the fifth wheel.

4 Claims, 4 Drawing Figures

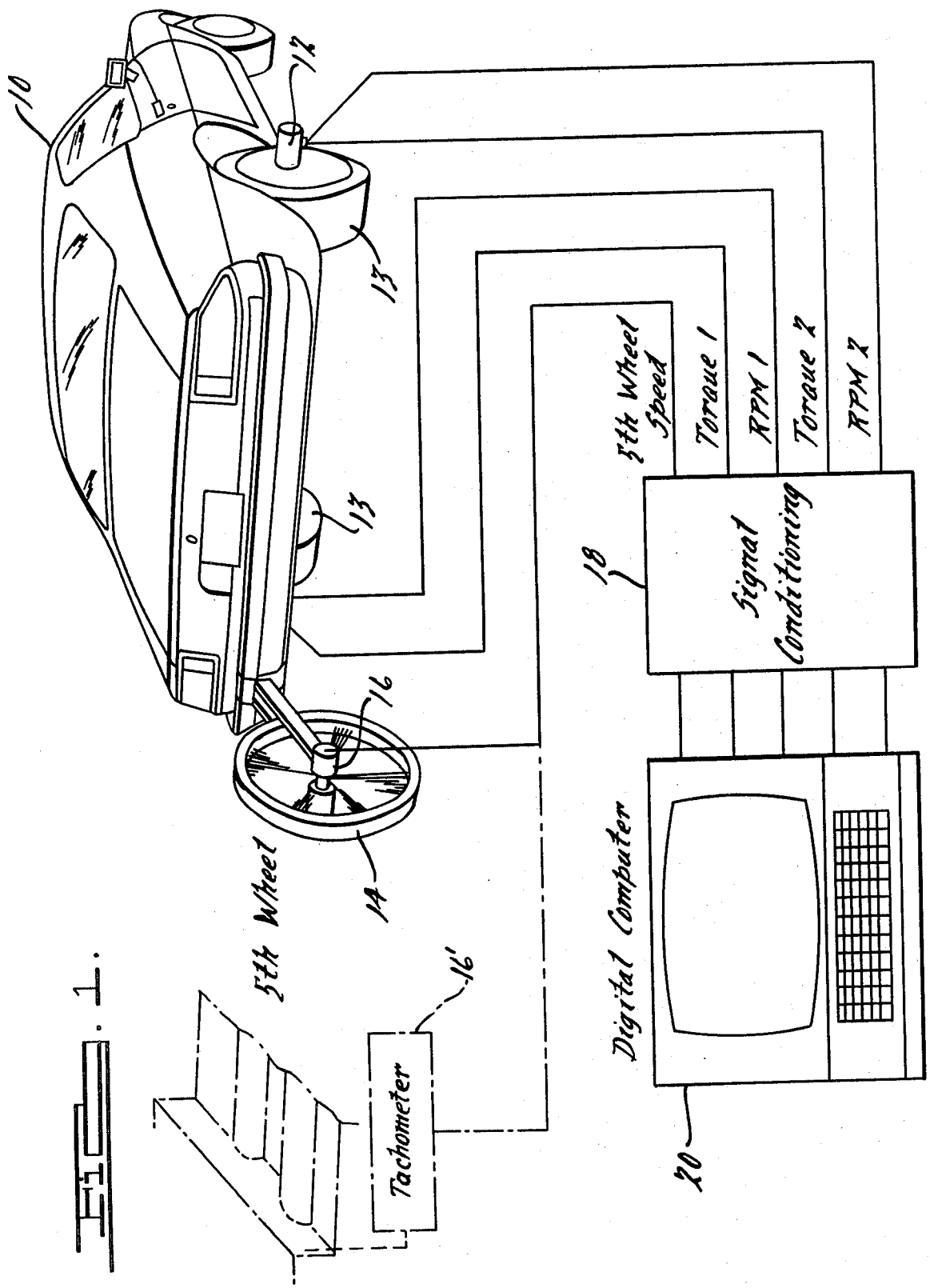

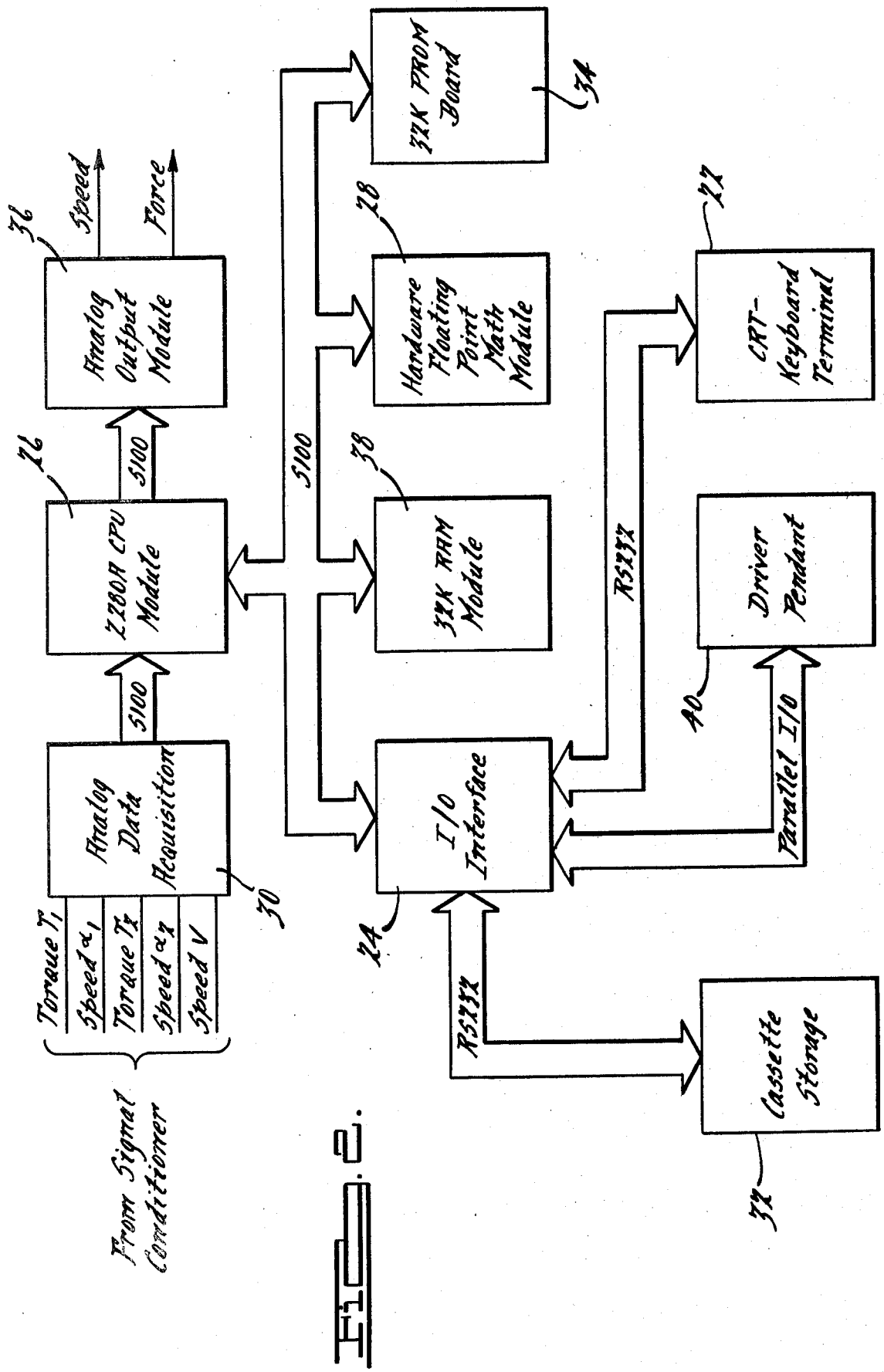

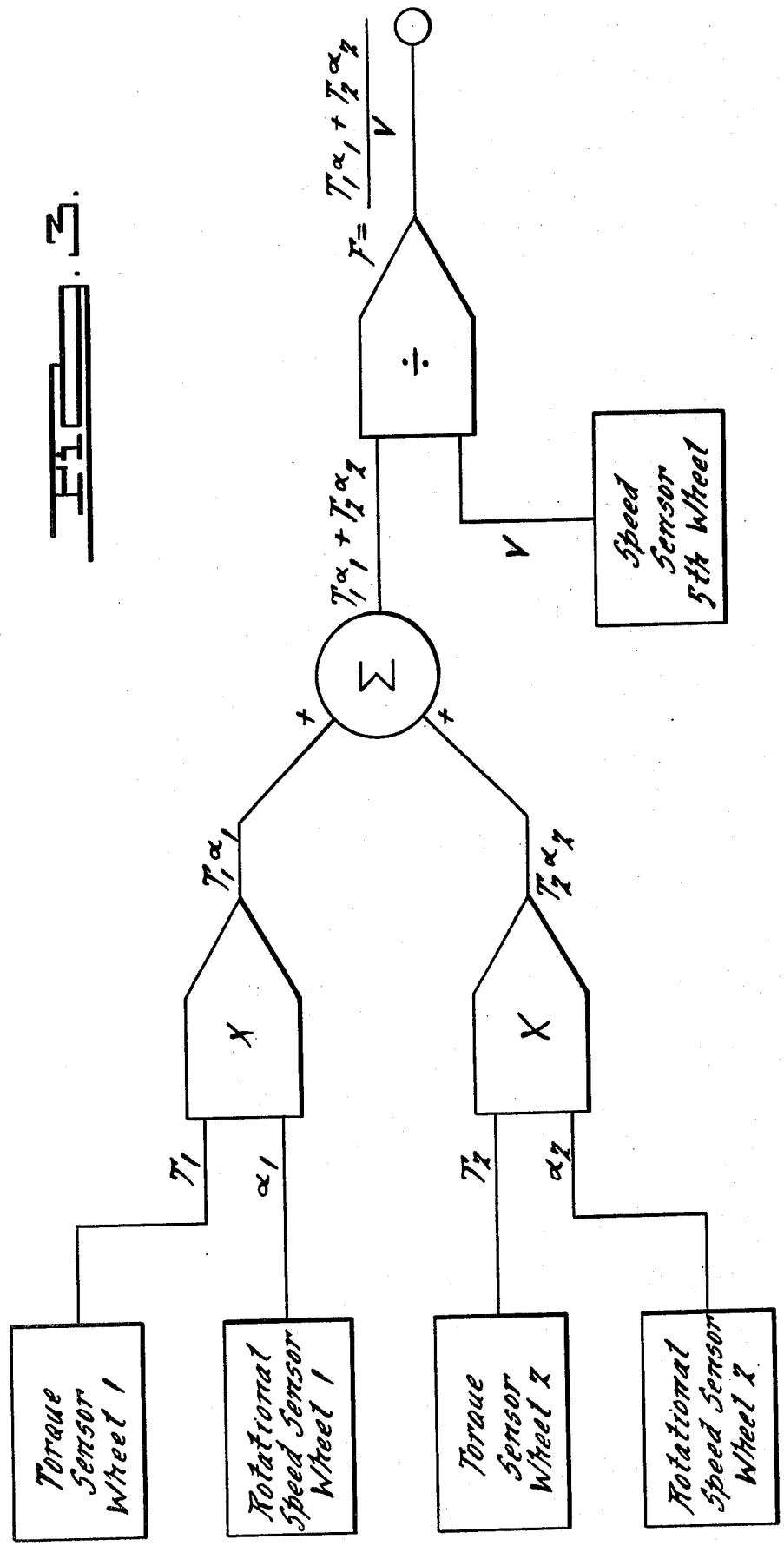

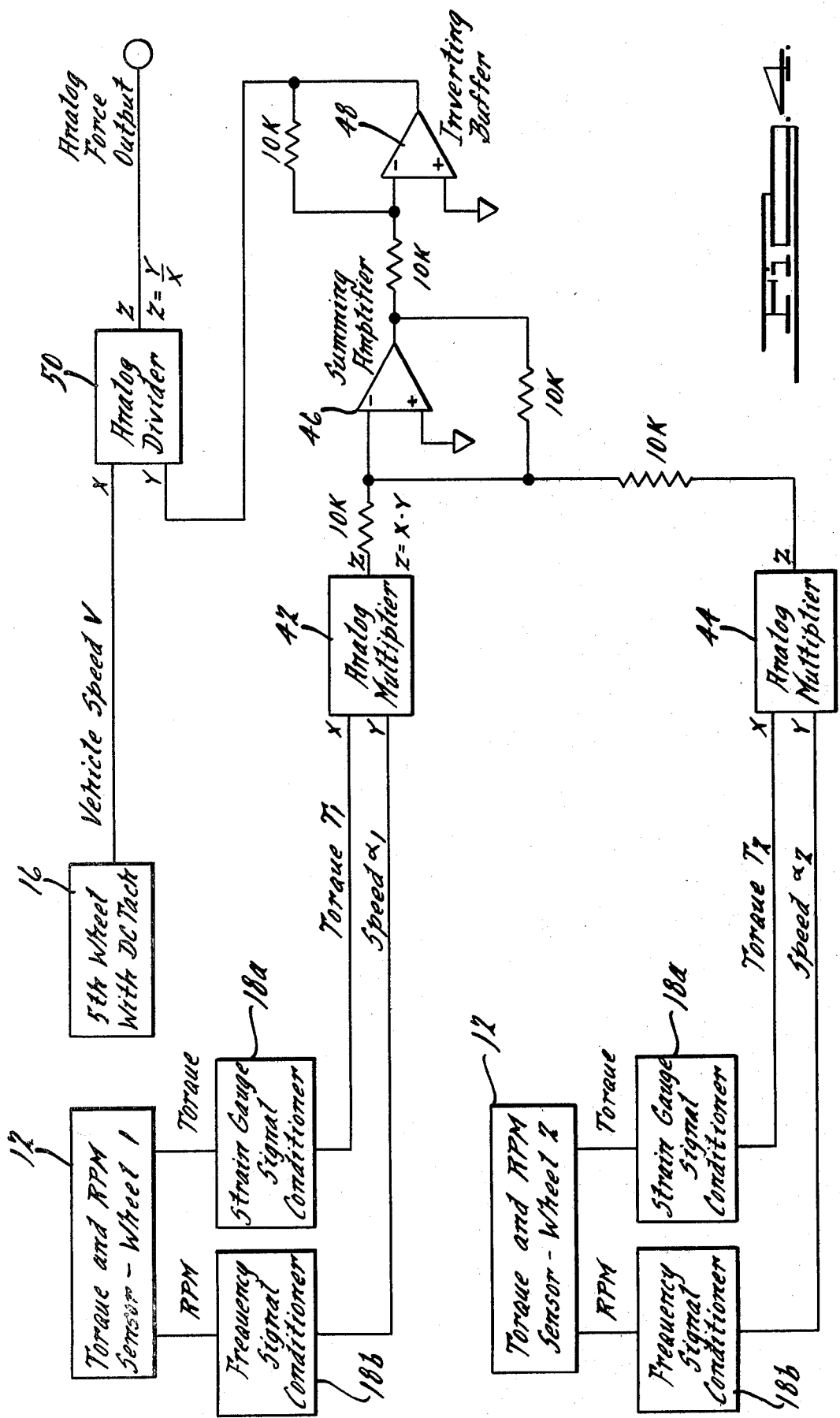

VEHICLE FORCE MEASUREMENT SYSTEM

BACKGROUND AND SUMMARY OF THE INVENTION

The present invention relates to a vehicle force measurement system for determining the true force output of a vehicle independent of the radius of the driving wheels of the vehicle.

Vehicle dynamometers are frequently used as simulation devices when testing vehicles in place for such purposes as EPA certification of emissions and mileage testing. In such applications, vehicle dynamometers simulate the inertia and road load forces to which a vehicle would normally be subjected during acutal operation of the vehicle. Vehicle dynamometers, when used as simulators, typically comprise a mechanical device, such as a flywheel, for simulating the inertia of the vehicle, a power absorption unit (PAU) for simulating road load forces, and a system controller for controlling the force output of the PAU. The inertia of a vehicle is a function of the vehicle's weight and is the force which must be overcome for the vehicle to accelerate or decelerate. Road load forces on the other hand are those forces which must be overcome to maintain vehicle speed and include such factors as breakaway torque, rolling friction, and windage.

The classic formula for calculating the force output of a vehicle is:

$$F = A + Bv + Cv^2 + Idv/dt \quad (1)$$

where F, v, and dv/dt are vehicle force, speed, and acceleration, respectively. The constants A, B, C and I (inertia) are unknowns whose values must be determined for the particular vehicle to be tested. In order for a solution to be possible, four sets of data including values of force, speed, and acceleration are required. Conventionally, these constants are determined by connecting torque and RPM sensors to the driving wheels of the vehicle to provide signals proportional to the torque and angular velocity of the respective wheels. At least four sets of readings at different speeds are taken. Linear velocity and force which describe the motion of the vehicle itself, are then computed for each set of data from the torque signals, angular velocity signals, and the radii of the wheels by the following expressions:

$$F = T_1/r_1 + T_2/r_2 \quad (2)$$

and $$V = \tfrac{1}{2}(\alpha_1 r_1 + \alpha_2 r_2) \quad (3)$$

where:
F = linear vehicle force,
V = vehicle speed,
$r_1$, $r_2$ = the radii of wheels 1 and 2,
$T_1$, $T_2$ = the torque measured at wheels 1 and 2, and
$\alpha_1$, $\alpha_2$ = the angular velocity of wheels 1 and 2.

The total force propelling the vehicle is given by the sum of the two wheel tangential forces while the vehicle speed is best represented by the average of the two wheel surface velocities. The four sets of values for F and V are then used to solve the equation given at (1) above for A, B, C, and I.

The accuracy of the measurements for both force and speed, as yielded by this method, however, is directly proportional to the stability of the wheel radii and the ability to determine the exact radii dimensions. The exact dimension of the radius of a rotating automobile wheel under load can be difficult to determine, and can vary significantly as a function of load, tire temperature, tire air pressure, tire wear, vehicle speed and acceleration, and road surface. Consequently, the accuracy of the values assigned to the constants A, B, C and I, and hence the subsequent ability of the dynamometer to accurately simulate inertia and road load forces, is significantly compromised.

Accordingly, it is the primary object of the present invention to provide a vehicle force measurement system which allows the measurement of vehicle force independent of wheel radius. In particular, the present invention comtemplates the use of a fifth wheel to determine accurately the vehicle speed while testing on the road. When testing on a dynamometer, the use of a fifth wheel is optional since an accurate speed signal is already provided by the dynamometer's speed sensor. As a result of the use of a fifth wheel, the rpm sensors mounted to the wheels of the vehicle are no longer used to provide vehicle linear speed. Rather, the rpm sensors are provided merely to condition the torque signals while making the conversion to linear force.

More particularly, the torque sensors and rpm sensors coupled to the driving wheels of the vehicle are utilized to determine the power output of the vehicle according to the following expression:

$$P = T_1\alpha_1 + T_2\alpha_2 \quad (4)$$

It is apparent from the above expression that the value of power (P) so obtained is independent of wheel radii dimensions. A decrease in wheel radius will result in an increase in linear force and in a proportional decrease in vehicle speed and will thus have no effect on the power output of the vehicle. Since power (P) is an instantaneous value, as are the values for torque and angular velocity from which it is computed, it is important that the torque and angular velocity signals be accurately synchronized to avoid potential error during speed transitions. The synchronization requirements are, of course, less strict for measurements made during steady-state conditions. As will subsequently be seen from the following description of the preferred embodiment, the data acquisition system of the present invention fulfills the synchronization requirements automatically.

Once the correct vehicle power output (P) is known and a correct vehicle speed (V) is obtained, either from the fifth wheel or from the speed sensor signal off the dynamometer, the correct vehicle linear force (F) can be obtained as follows:

$$F = P/V \quad (5)$$

Accordingly, by combining the two expressions given at (4) and (5), the correct vehicle linear force can be obtained by the following:

$$F = \frac{T_1\alpha_1 + T_2\alpha_2}{V} \quad (6)$$

With $T_1$ and $T_2$ in Newton meters, $\alpha_1$ and $60_2$ in 1/second, and V in meters/second, F will be given in Newtons. A pound reading can, of course, be obtained by dividing Newtons by the conversion factor 4.448. Thus, it will be appreciated that by using the vehicle speed measurement from a fifth wheel to determine the force output of the vehicle, the inaccuracies associated with the use of wheel radii dimensions are avoided.

Additional objects and advantages of the present invention will become apparent from a reading of the detailed description of the preferred embodiment which makes reference to the following set of drawings in which:

DESCRIPTION OF THE DRAWINGS

FIG. 1 is a block diagram of a vehicle force measurement system according to the present invention;

FIG. 2 is a block diagram of the digital computer utilized in one of the preferred embodiments of the present invention;

FIG. 3 is a functional block diagram of the software for the digital computer in FIG. 2; and FIG. 4 is an electrical block diagram of another embodiment of the present invention.

DETAILED DESCRIPTION OF THE PREFERRED EMBODIMENTS

Referring to FIG. 1, a system block diagram of a typical application of the present vehicle force measurement system is shown. The particular application depicted in FIG. 1 corresponds to a test set-up for measuring the force output of a vehicle while operating on a roadway. Torque and RPM sensors 12 are connected to each of the driving wheels 13 of the vehicle 10. In the preferred embodiment herein, a combination torque and RPM sensor manufactured by Lebow, No. 11246-133-8K, is used. The torque sensors comprise strain gauge type transducers that are adapted to produce an analog signal proportional to the torsional load applied to the transducer by the driving wheel of the vehicle. The RPM sensors comprise Hall-effect devices which are adapted to produce a signal having a frequency proportional to the rotational speed of the wheel.

A conventional fifth wheel 14 having a DC tachometer 16 connected thereto is fastened to the rear bumper of the vehicle 10 to provide an accurate vehicle speed reading. In the preferred embodiment the fifth wheel and DC tachometer is manufactured by Nucleus, under the designation NC-7. The particular DC tachometer utilized provides a direct analog output signal proportional to the rotational speed of the fifth wheel.

Optionally, if the vehicle is tested in place with the driving wheels of the vehicle engaging a pair of rollers (shown in phantom in FIG. 1), the tachometer 16' can be connected directly to the rollers so that the speed signal from the tachometer is proportional to the rotational speed of the rollers.

The torque (T) and angular velocity ($\alpha$) signals generated by the torque and RPM sensors 12, as well as the fifth wheel speed signal (V) from the speed sensor 16, are provided through signal conditioning circuitry 18 to a digital computer 20. The microcomputer selected in the preferred embodiment was manufactured by Northstar, although other microcomputers, such as the XYCOM System No. 3935A, or equivalent, which are especially designed for hostile environments can also be used. As shown in the computer block diagram illustrated in FIG. 2, the microcomputer system preferably includes a CRT display and keyboard terminal 22, an I/O interface 24, a Z80A microprocessor 26, an arithmetic logic unti 28 for extra mathematics processing capabilities, a high speed analog data acquisition module 30, and a cassette storage 32. A 32K programmable read-only memory board 34 is provided for storing the necessary software for determining the force output of the vehicle according to the present invention. Each of the items identified in FIG. 2 is commerically available from various manufacturers. In the preferred embodiment, the following modules were selected: analog data acquisition module 30, Dual AIM-12; Z80A CPU module 26, Northstar; analog output module 36, Dual AOM-12; I/O interface 24, Cromenco TU-ART; 32K RAM module 38 and hardware floating point math module 28, Northstar; and 32K PROM board 36, Cromenco 32K BS.

The analog data acquisition module 30 serves to latch or "read" the torque ($T_1$ and $T_2$), angular velocity ($\alpha_1$ and $\alpha_2$) and speed (V) signals from the various sensors for input to the microcomputer 26. Since torque and speed are instantaneous values, it is important that the analog data acquisition module 30 have a response time fast enough to satisfy the synchronization requirements of the system. In the preferred embodiment illustrated in FIG. 2, the analog data acquisition module 30 has a response time of approximately 30 $\mu$sec. Accordingly, all five analog input signals can sequentially be read by the module in approximately 150 $\mu$sec. Since all of the analog sensor signals are initially filtered in the signal conditioning circuitry 18 (FIG. 1) by filters having a cutoff frequency of approximately 2 Hz, the acquisition time of module 30 effectively appears to be instantaneous relative to the maximum rate of change possible in the values of the sensor signals. It will also be noted that the filters in the signal conditioning circuitry 18 are preferably all identical to insure uniformity of delay in each of the sensor signals.

The analog output module 36 serves to provide analog output signals corresponding to the speed and force output of the vehicle for recording purposes or for display on an analog meter. The driver pendant 40 essentially comprises a switch which is manually actuated by the operator of the vehicle to initiate and terminate the testing procedure.

A functional block diagram of the software required for this embodiment is illustrated in FIG. 3. As shown in the diagram, the respective torque (T) and rotational wheel speed ($\alpha$) signals from each of the two driving wheels of the vehicle are initially multiplied together to provide the power output of each wheel. The two products are then added together to provide the total power output (P) of the vehicle which, as indicated in the diagram is equal to $T_1\alpha_1 + T_2\alpha_2$. The resulting sum is then divided by the speed of the vehicle (V) as measured by the speed sensor off the fifth wheel to provide the linear force output of the vehicle.

Turning now to FIG. 4, an electrical block diagram of an analog implementation of the present invention is shown. The torque and RPM signals from the torque and RPM sensor 12 attached to each driving wheel of the vehicle are provided to a strain gauge signal conditioning circuit 18a and a frequency signal conditioning circuit 18b, respectively. The conditioning circuits utilized in the preferred embodiment are manufactured by Daytronic, Nos. 3140 and 3170. The frequency signal conditioning circuit 18b is adapted to convert the frequency signal from the RPM sensor 12 to a corresponding analog signal, the magnitude of which is proportional to the frequency of the RPM wheel speed signal. As noted in connection with the description of the first embodiment, the conditioning circuits 18a and 18b also include identical filters having cutoff frequencies of approximately 2 Hz to insure a uniform delay in each of the sensor signal lines. The respective torque and speed signals ($T_1$, $a_1$ and $T_2$, $a_2$) from each of the two wheels are provided to the inputs of a pair of analog multipliers 42 and 44, which in the preferred embodiment are manufactured by Burr-Brown, No. 4302. Unlike the digital embodiment discussed above which functions serially, the analog embodiment contains separate analog multipliers 42 and 44 which can, of course, function simultaneously, thus automatically satisfying the synchronization requirements of the system. In other words, as in the first embodiment, the torque and speed signals from the sensors are effectively being sampled simultaneously by the analog multipliers 42 and 44. The outputs from the analog multipliers 42 and 44 are tied together and connected to the inverting input of a summing amplifier 46 which has its output connected to the inverting input of a buffer amplifier 48. The output of inverting buffer amplifier 48 is connected to the "Y" input of an analog divider 50, which in the preferred embodiment is also manufactured by Burr-Brown, No. 4302. The "X" input of analog divider 50 is connected to receive the vehicle speed signal (V) from the DC tachometer 16 coupled to the fifth wheel. Analog divider 50 is adapted to divide the magnitude of the signal provided to its "Y" input by the magnitude of the signal provided to its "X" input. Thus, it will be appreciated that the analog signal produced at the output "Z" of analog divider 50 corresponds to the force output of the vehicle.

While the above description constitutes the preferred embodiments of the present invention, it will be appreciated that the invention is suusceptible to modification, variation and change without departing from the proper scope or fair meaning of the accompanying claims.

I claim:

1. A vehicle force measurement system for measuring the force output of a vehicle while the vehicle is operating on a roadway, including:

torque sensor means connected to each of the driving wheels of the vehicle for producing a torque signal related to the rotational torque applied to the wheels;

speed sensor means connected to each of the driving wheels of the vehicle for producing an angular velocity signal related to the rotational speed of the wheels;

a fifth wheel connected to the vehicle so that said fifth wheel rotates at the speed of the vehicle;

tachometer means associated with said fifth wheel for producing a speed signal related to the velocity of the vehicle; and circuit means for determining the force output of the vehicle by summing the products of said torque and angular velocity signals from each driving wheel and dividing the result by said speed signal.

2. The vehicle force measurement system of claim 1 wherein said circuit means includes means for sampling the values of said torque, angular velocity, and speed signals substantially simultaneously.

3. A vehicle force measurement system for measuring the force output of a vehicle while testing the vehicle in place with the driving wheels of the vehicle engaging a pair of rollers having a tachometer associated with the rollers for producing a speed signal related to the surface velocity of the rollers, including:

torque sensor means connected to each of the driving wheels of the vehicle for producing a torque signal related to the rotational torque applied to the wheels;

speed sensor means connected to each of the driving wheels of the vehicle for producing an angular velocity signal related to the rotational speed of the wheels; and circuit means for determining the force output of the vehicle by summing the products of said torque and angular velocity signals from each driving wheel and dividing the result by said speed signal.

4. The vehicle force measurement system of claim 3 wherein said circuit means includes means for sampling the values of said torque, angular velocity, and speed signals substantially simultaneously.

* * * * *